US009240285B2

(12) United States Patent
Djebara et al.

(10) Patent No.: US 9,240,285 B2
(45) Date of Patent: Jan. 19, 2016

(54) MULTI-NOTCHED ANODE FOR ELECTROLYTIC CAPACITOR

(71) Applicant: AVX Corporation, Fountain Inn, SC (US)

(72) Inventors: Lotfi Djebara, Paris (FR); Ludek Kubes, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 229 days.

(21) Appl. No.: 13/972,990

(22) Filed: Aug. 22, 2013

(65) Prior Publication Data
US 2014/0321029 A1 Oct. 30, 2014

Related U.S. Application Data

(60) Provisional application No. 61/816,860, filed on Apr. 29, 2013.

(51) Int. Cl.
*H01G 9/042* (2006.01)
*H01G 9/052* (2006.01)
*H01G 9/028* (2006.01)

(52) U.S. Cl.
CPC .............. *H01G 9/052* (2013.01); *H01G 9/028* (2013.01); *H01G 9/042* (2013.01); *H01G 9/0425* (2013.01)

(58) Field of Classification Search
USPC ......... 361/516–519, 523–525, 528, 529, 530, 361/440, 541
See application file for complete search history.

(56) References Cited

U.S. PATENT DOCUMENTS

| 3,345,545 | A | 10/1967 | Bourgault et al. |
| 5,457,862 | A | 10/1995 | Sakata et al. |
| 5,473,503 | A | 12/1995 | Sakata et al. |
| 5,729,428 | A | 3/1998 | Sakata et al. |
| 5,812,367 | A | 9/1998 | Kudoh et al. |
| 5,949,639 | A | 9/1999 | Maeda et al. |
| 6,191,936 | B1 * | 2/2001 | Webber et al. ............... 361/528 |
| 6,197,252 | B1 | 3/2001 | Bishop et al. |
| 6,322,912 | B1 | 11/2001 | Fife |
| 6,391,275 | B1 | 5/2002 | Fife |
| 6,416,730 | B1 | 7/2002 | Fife |
| 6,527,937 | B2 | 3/2003 | Fife |

(Continued)

OTHER PUBLICATIONS

Abstract of Japanese Patent—JP2004247410, Sep. 2, 2004 2 pages.

(Continued)

*Primary Examiner* — Nguyen T Ha
(74) *Attorney, Agent, or Firm* — Dority & Manning, P.A.

(57) ABSTRACT

A solid electrolytic capacitor that includes an anode body, a dielectric overlying the anode body, a solid electrolyte that contains one or more conductive polymers and overlies the dielectric, and an external coating that overlies the solid electrolyte, is provided. The external coating includes at least one carbonaceous layer and at least one metal layer. In addition to the aforementioned layers, the external coating can also include at least one conductive polymer layer that can be disposed between the carbonaceous and metal layers. Among other things, such a conductive polymer layer can reduce the likelihood that the carbonaceous layer will delaminate from the solid electrolyte during use. Further, the notched geometry of the anode body itself is selected to minimize the risk of delamination of the external coating layers from the anode body. This combination of characteristics can increase the mechanical robustness of the part and improve its electrical performance.

22 Claims, 10 Drawing Sheets

(56) References Cited

U.S. PATENT DOCUMENTS

| | | |
|---|---|---|
| 6,576,099 B2 | 6/2003 | Kimmel et al. |
| 6,592,740 B2 | 7/2003 | Fife |
| 6,639,787 B2 | 10/2003 | Kimmel et al. |
| 6,987,663 B2 | 1/2006 | Merker et al. |
| 7,116,548 B2 * | 10/2006 | Satterfield et al. ............ 361/528 |
| 7,154,742 B1 | 12/2006 | Hahn et al. |
| 7,220,397 B2 | 5/2007 | Kimmel et al. |
| 7,262,511 B2 | 8/2007 | Osako et al. |
| 7,341,705 B2 | 3/2008 | Schnitter |
| 7,342,775 B2 | 3/2008 | Hahn et al. |
| 7,381,396 B2 | 6/2008 | Thomas et al. |
| 7,419,926 B2 | 9/2008 | Schnitter et al. |
| 7,515,396 B2 | 4/2009 | Biler |
| 8,125,768 B2 * | 2/2012 | Horacek et al. ............... 361/532 |

OTHER PUBLICATIONS

Abstract of Japanese Patent—JP2007311531, Nov. 29, 2007, 1 page.
Search Report for GB1406283.0 dated Aug. 29, 2014, 3 pages.

* cited by examiner

MULTI-NOTCHED ANODE FOR ELECTROLYTIC CAPACITOR

CROSS REFERENCE TO RELATED APPLICATION

The present application claims benefit of U.S. Provisional Application Ser. No. 61/816,860 having a filing date of Apr. 29, 2013.

BACKGROUND OF THE INVENTION

Solid electrolytic capacitors (e.g., tantalum capacitors) have been a major contributor to the miniaturization of electronic circuits and have made possible the application of such circuits in extreme environments. Conventional solid electrolytic capacitors are often formed by pressing a metal powder (e.g., tantalum) around a metal lead wire, sintering the pressed part, anodizing the sintered anode, and thereafter applying a solid electrolyte. The part is then finished by applying a metal layer, which can act as a conductor, contact layer, or charge collector for the capacitor. A carbonaceous layer is typically disposed between the solid electrolyte and the metal layer to limit the contact between the metal layer and the solid electrolyte, which would otherwise increase the resistance of the capacitor. One problem, however, is that it is often difficult to achieve good adhesion between the carbonaceous layer and the solid electrolyte, which can also result in an increase in the resistance of the capacitor. Various attempts have been made to address this problem. U.S. Pat. No. 8,125,768 to Horacek, et al., for instance, describes the use of a polymeric outer layer that is disposed between the carbonaceous layer and the graphite layer to improve adhesion between the solid electrolyte and the carbonaceous layer. Unfortunately, this technique is still problematic in that achieving good adhesion between each of these layers can still be difficult, which can result in delamination of these layers from the capacitor body. Such delamination can increase the electrical series resistance (ESR) of the capacitor, which detrimentally affects the electrical performance of the capacitor.

As such, a need remains for a solid electrolytic capacitor where delamination between the solid electrolyte and the external layers of the solid electrolytic capacitor is minimized.

SUMMARY OF THE INVENTION

In accordance with one embodiment of the present invention, a solid electrolytic capacitor is disclosed that comprises a capacitor element. The capacitor element comprises a sintered, porous anode body, a dielectric overlying the anode body, a solid electrolyte overlying the dielectric, and an external coating. The sintered, porous anode body has a plurality of notches located on one or more exterior surfaces of the anode body, wherein each notch is defined by a first wall and an opposing second wall, further wherein each notch has a depth of from about 0.050 millimeters to about 0.250 millimeters. Meanwhile, the solid electrolyte contains a first conductive polymer layer; and the external coating contains carbonaceous layer and a metal layer that overlies the carbonaceous layer.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figure, in which.

Figure 1:
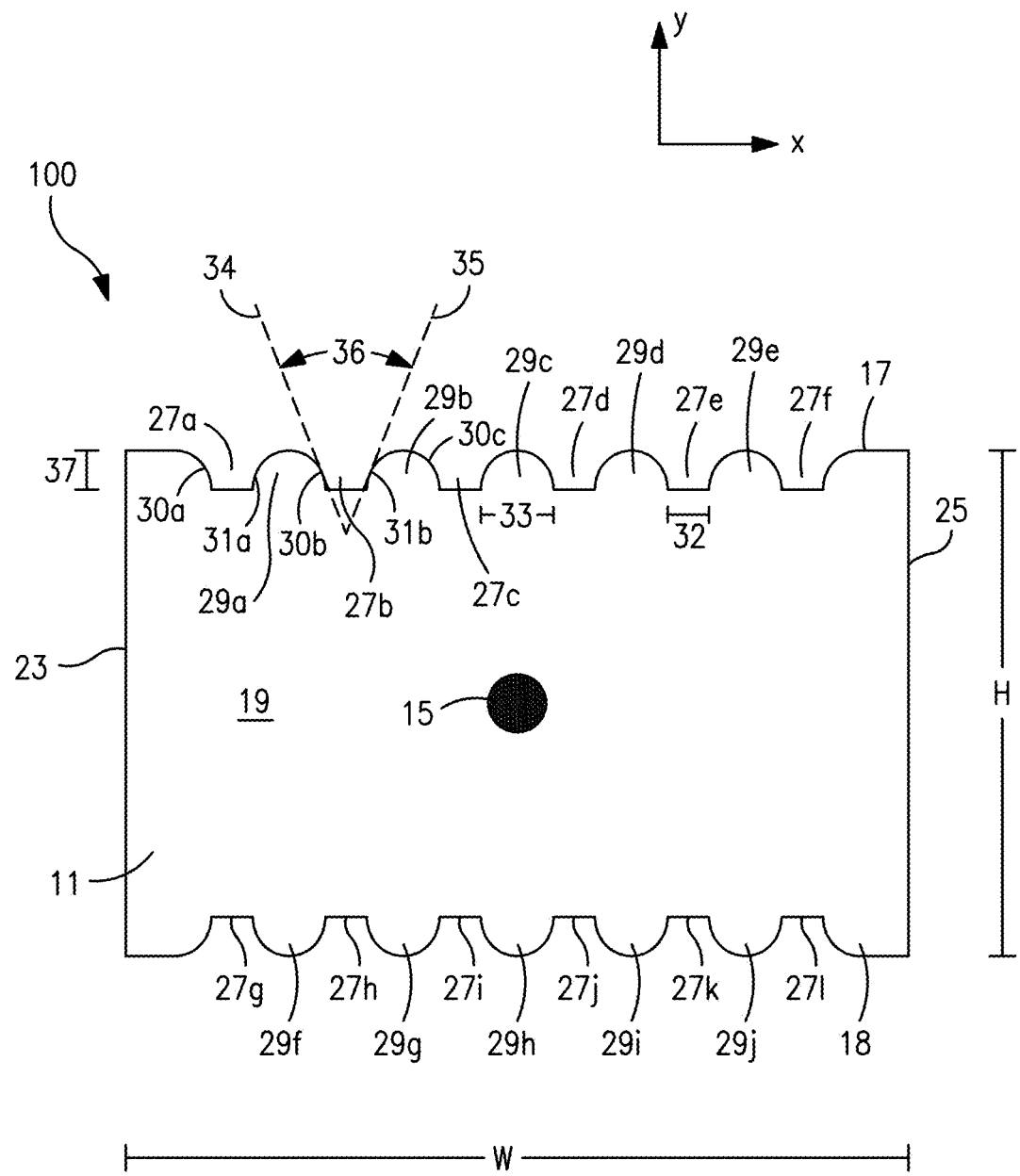
FIG. 1 is a cross-sectional view of the front surface of one embodiment of an anode of the present invention.

Repeat use of reference characters in the present specification and drawing is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a solid electrolytic capacitor that includes a capacitor element, where the capacitor element includes an anode body, a dielectric overlying the anode body, a solid electrolyte that contains one or more conductive polymers and overlies the dielectric, and an external coating that overlies the solid electrolyte. The external coating includes at least one carbonaceous layer (e.g., graphite) and at least one metal layer (e.g., silver). In addition to the aforementioned layers, the external coating can also include at least one conductive polymer layer that is disposed between the carbonaceous and metal layers. Among other things, such a conductive polymer layer can reduce the likelihood that the carbonaceous layer will delaminate from the solid electrolyte during use. This can increase the mechanical robustness of the part and improve its electrical performance. Despite this additional layer, however, there is still a risk of delamination of the external coating layers. As such, the present inventors have discovered that the particular topography of the anode of the present invention can be limit delamination of the external layers, resulting in a capacitor having improved electrical capabilities, such as reduced ESR. In addition, the topography of the anode of the present invention can ensure effective drainage of the solutions used to coat the anode with the conductive polymer, carbonaceous layer, metal layer, etc. during manufacturing, which can be effective against polymer bridging issues. For instance, a series of longitudinal depressions (i.e., notches) and corresponding protrusions can be formed in the anode body, and it has been discovered that this resulting surface geometry can reduce the ESR of a capacitor by inhibiting delamination of the external layers of the capacitor. Further, such surface geometry can prevent an increase in ESR post-reflow.

Various embodiments of the present invention will now be described in more detail.

I. Anode Body

The anode body of the capacitor element is formed from a valve metal composition. The specific charge of the composition may vary, such as from about 2,000 µF*V/g to about 200,000 µF*V/g, in some embodiments from about 3,000 µF*V/g to about 100,000 µF*V/g or more, and in some embodiments, from about 4,000 to about 75,000 µF*V/g. As is known in the art, the specific charge may be determined by multiplying capacitance by the anodizing voltage employed, and then dividing this product by the weight of the anodized electrode body.

The valve metal composition generally contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. The niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al.

To form the anode body, a powder of the valve metal composition is generally employed. The powder may contain particles any of a variety of shapes, such as nodular, angular, flake, etc., as well as mixtures thereof. The particles may increase the specific charge of the anode when anodized at higher voltages, thereby increasing energy density. The particles typically have a screen size distribution of at least about 60 mesh, in some embodiments from about 60 to about 325 mesh, and in some embodiments, from about 100 to about 200 mesh. The particles may also have a specific surface area of from about 0.5 to about 10.0 $m^2/g$, in some embodiments from about 0.7 to about 5.0 $m^2/g$, and in some embodiments, from about 1.0 to about 4.0 $m^2/g$. The term "specific surface area" generally refers to surface area as determined by the physical gas adsorption (B.E.T.) method of Bruanauer, Emmet, and Teller, Journal of American Chemical Society, Vol. 60, 1938, p. 309, with nitrogen as the adsorption gas. The test may be conducted with a MONOSORB® Specific Surface Area Analyzer available from QUANTACHROME Corporation, Syosset, N.Y., which measures the quantity of adsorbate nitrogen gas adsorbed on a solid surface by sensing the change in thermal conductivity of a flowing mixture of adsorbate and inert carrier gas (e.g., helium).

The bulk density (also known as Scott density) is also typically from about 0.1 to about 2 grams per cubic centimeter ($g/cm^3$), in some embodiments from about 0.2 $g/cm^3$ to about 1.5 $g/cm^3$, and in some embodiments, from about 0.4 $g/cm^3$ to about 1 $g/cm^3$. "Bulk density" may be determined using a flow meter funnel and density cup. More specifically, the powder sample may be poured through the funnel into the cup until the sample completely fills and overflows the periphery of the cup, and thereafter sample may be leveled-off by a spatula, without jarring, so that it is flush with the top of the cup. The leveled sample is transferred to a balance and weighed to the nearest 0.1 gram to determine the density value. Such an apparatus is commercially available from Alcan Aluminum Corp. of Elizabeth, N.J. The particles may also have an average size (e.g., width) of from about 0.1 to about 100 micrometers, in some embodiments from about 0.5 to about 70 micrometers, and in some embodiments, from about 1 to about 50 micrometers.

Certain additional components may also be included in the powder. For example, the powder may be optionally mixed with a binder and/or lubricant to ensure that the particles adequately adhere to each other when pressed to form the anode body. Suitable binders may include, for instance, poly (vinyl butyral); poly(vinyl acetate); poly(vinyl alcohol); poly (vinyl pyrrolidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly (butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may then be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. In addition, the powder may be compacted around an anode lead (e.g., tantalum wire). It should be further appreciated that the anode lead may alternatively be attached (e.g., welded) to the anode body subsequent to pressing and/or sintering of the anode body. The depressions/notches and corresponding protrusions of the present invention may be formed during pressing as would be known to those skilled in the art. For example, the press mold may contain a series of longitudinal depressions/notches and protrusions that correspond to the desired shape of the anode. In this manner, the powder is compressed around the depressions/notches and protrusions so that when removed from the mold, the resulting anode body contains longitudinal depressions/notches (i.e., channels) at those areas where the longitudinal protrusions were located in the mold and longitudinal protrusions at those areas where longitudinal depressions/notches were located in the mold. The resulting anode has a series of longitudinal channels along at least one exterior surface. However, it is to be understood that it is not required that the depressions/notches and corresponding protrusions be formed during pressing and that the depressions/notches and protrusions may instead be formed by any other suitable means after pressing of the anode powder.

After compaction, the resulting anode body may then be diced into any desired shape, such as a square, rectangle, circle, oval, triangle, hexagon, octagon, heptagon, pentagon, etc. The anode body may then be subjected to a heating step in which most, if not all, of any binder/lubricant are removed. For example, the anode body is typically heated by an oven that operates at a temperature of from about 150° C. to about 500° C. Alternatively, the binder/lubricant may also be removed by contacting the pellet with an aqueous solution, such as described in U.S. Pat. No. 6,197,252 to Bishop, et al. Thereafter, the anode body is sintered to form a porous, integral mass. The temperature, atmosphere, and time of the sintering may depend on a variety of factors, such as the type of anode, the size of the anode, etc. Typically, sintering occurs at a temperature of from about from about 800° C. to about 1900° C., in some embodiments from about 1000° C. to about 1500° C., and in some embodiments, from about 1100° C. to about 1400° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

Figure 2:
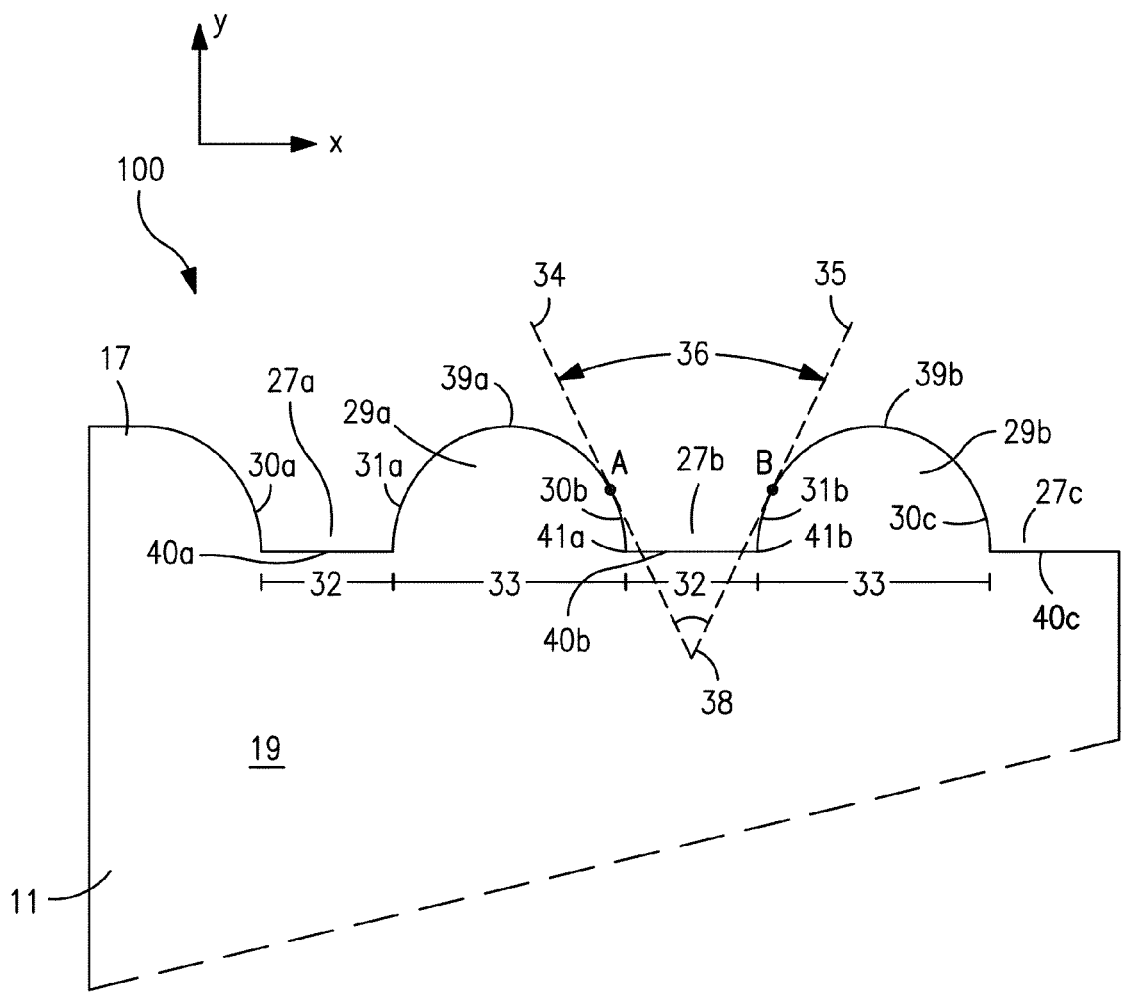
FIG. 2 is a zoomed in view of the anode of FIG. 1 to more closely show the anode geometry.
Figure 3:
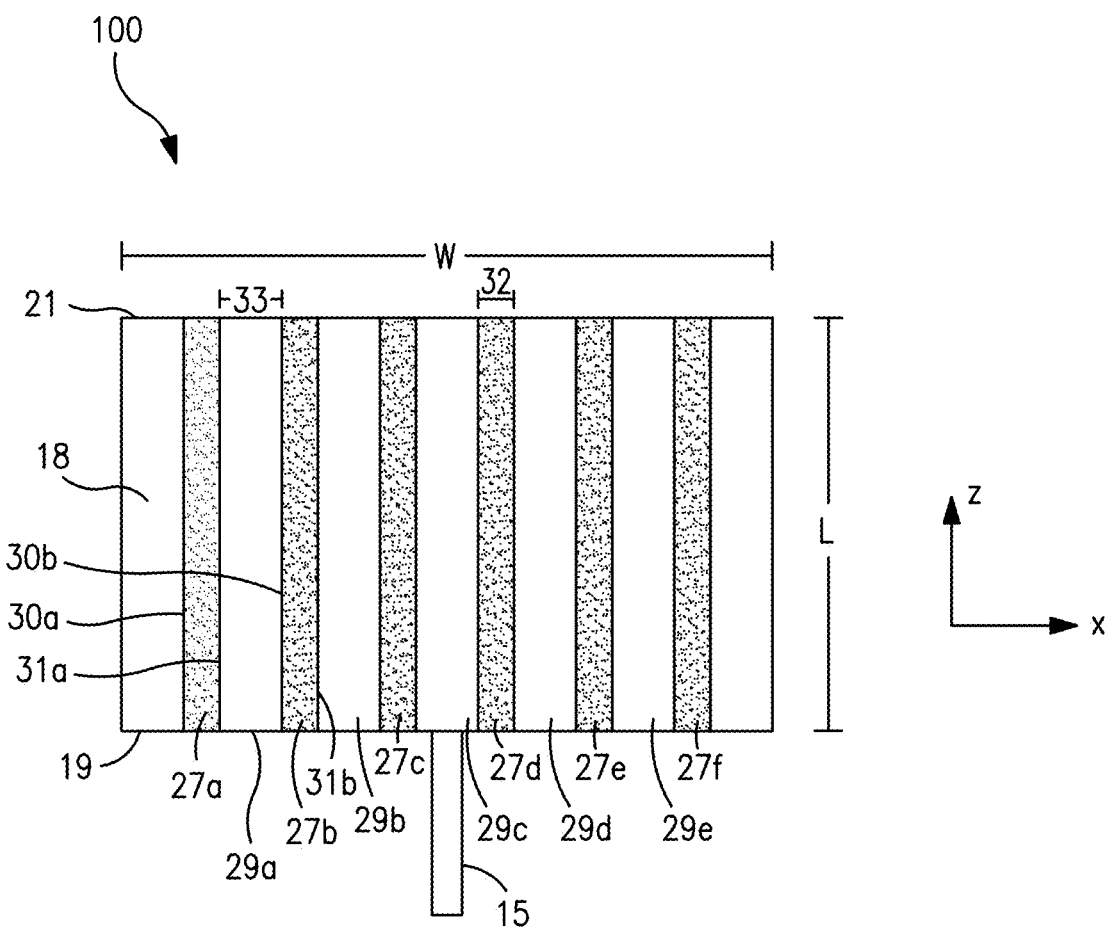
FIG. 3 is a top view of the anode of FIG. 1.

Upon sintering, an anode body is thus formed that contains a plurality of longitudinal depressions/notches and corresponding protrusions on at least one exterior surface of the anode body in accordance with the present invention. Referring to FIGS. 1-3, for example, one embodiment of an anode 100 is shown that contains a porous, sintered anode body 11 having a first side 23 and a second side 25 positioned between a front surface 19 and a rear surface 21. The anode body 11 is also defined by an upper surface 17 and a lower surface 18. The cross-sectional shape of the front surface 19 and/or the rear surface 21 may generally vary based on the desired shape of the anode body 11. In this particular embodiment, for example, both front surface 19 and rear surface 21 have a rectangular cross-sectional shape such that the anode body ills rectangular. Other suitable shapes may include, for instance, square, triangular, hexagonal, octagonal, heptagonal, pentagonal, trapezoidal, elliptical, star, sinusoidal, etc.

The anode body 11 also has a length "L" in the longitudinal z-direction, and a width "W" in the x-direction and height "H" in the y-direction. The length L of the anode body 11 may range from about 0.25 millimeters to about 40 millimeters, in some embodiments from about 0.5 millimeters to about 20 millimeters, in some embodiments from about 0.75 millimeters to about 10 millimeters, and in some embodiments from about 1 millimeter to about 5 millimeters. The width W of the anode body 11 may range from about 0.5 millimeters to about 50 millimeters, in some embodiments from about 0.75 millimeters to about 25 millimeters, in some embodiments from about 1 millimeter to about 20 millimeters, and in some embodiments from about 1.25 millimeters to about 10 millimeters. Likewise, the height H of the anode body 11 may, for example, range from about 0.25 millimeters to about 20 millimeters, in some embodiments from about 0.5 millimeters to about 15 millimeters, in some embodiments from about 0.75 millimeters to about 10 millimeters, and in some embodiments from about 1 millimeter to about 5 millimeters. Regardless of its particular size or shape, the anode body 11 contains a plurality of depressions/notches 27(a-l) that are recessed into one or more exterior surfaces of the anode body 11, such as upper surface 17 and/or lower surface 18. Further, the depressions/notches 27(a-l) are "longitudinally extending" in the sense that they possess a length L in the longitudinal z-direction of the anode body 11, as shown in FIG. 3. However, while the notches/depressions 27(a-l) are substantially parallel with the longitudinal z-direction, this is by no means a requirement.

Figure 5:
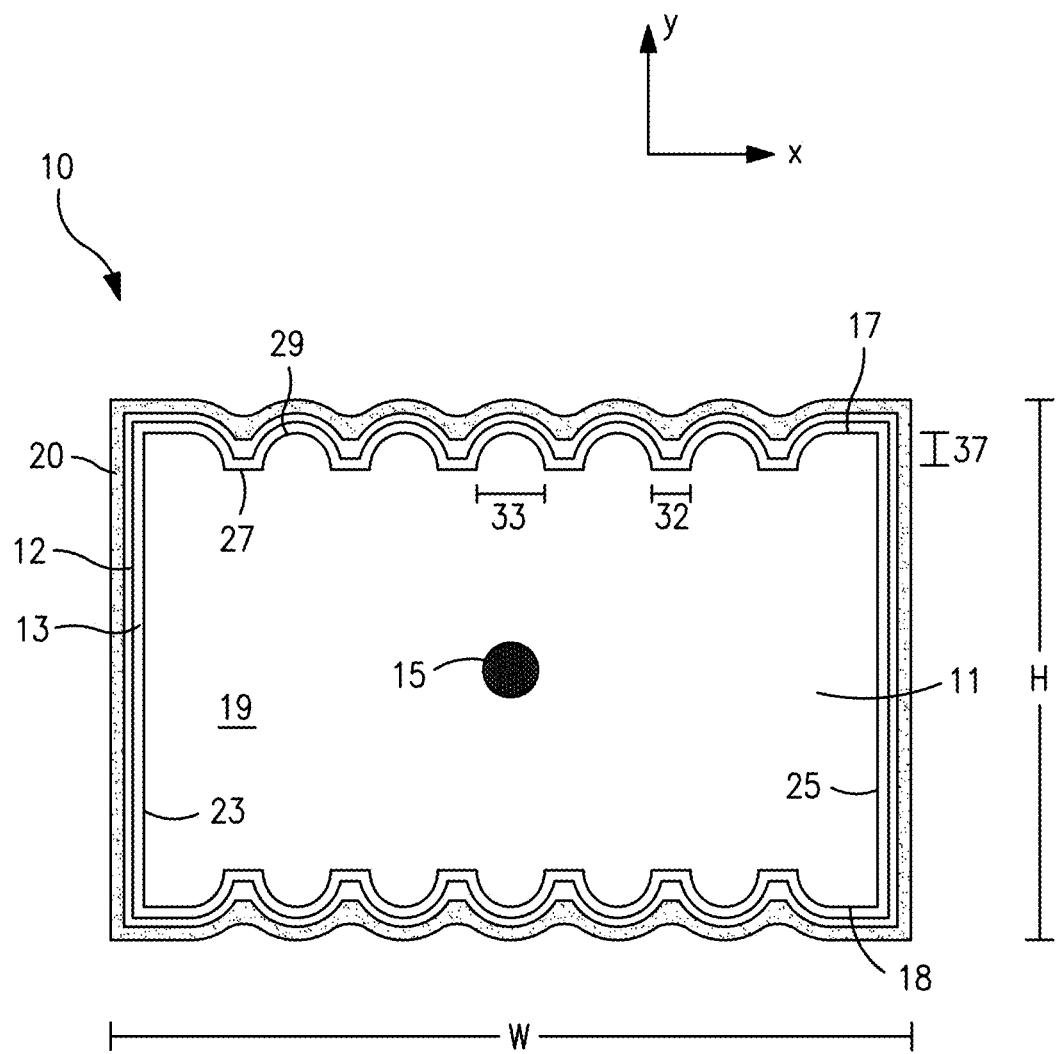
FIG. 5 is a cross-sectional view of a front surface of one embodiment of a solid electrolytic capacitor element of the present invention.

The number of such longitudinally extending depressions/notches present on each of the exterior surfaces of the anode body may vary, but is typically from 2 to 30, in some embodiments from 3 to 24, in some embodiments, from 4 to 16, and, in some embodiments, from 5 to 15. It is generally desired that the plurality of depressions/notches are distributed symmetrically and equidistant from each other, although this is by no means a requirement. In FIGS. 1, 3, and 5, for example, the depicted anode body 11 contains six separate depressions/notches 27(a-f) recessed in the upper surface 17 and six separate depressions/notches 27(g-l) recessed in the lower surface 18, although it is to be understood that more than or less than six depressions/notches or less than six depressions/notches can be recessed in the upper surface 17 and lower surface 18. The depressions/notches 27(a-l) shown in FIGS. 1-3 extend in the longitudinal direction "L" along the entire length of the anode body 11 and intersect both the front surface 19 and the rear surface 21, as shown in FIG. 3. It should be understood, however, that one or more of the plurality of depressions/notches may also extend along only a portion of the anode body length so that they intersect only one end of the anode body, or so that they do not intersect either end. Further, each depression/notch can have a generally flat surface. For instance, as shown in FIG. 2, notch 27a has a flat surface 40a and notch 27b has a flat surface 40b.

As shown in FIGS. 1-3 and 5, depressions/notches 27(a-l) are associated with corresponding protrusions 29(a-j). For instance, the formation of depressions/notches 27a and 27b in the upper surface 17 of the anode body 11 results in the formation of a corresponding protrusion 29a, while the formation of depressions/notches 27b and 27c in the upper surface 17 of the anode body 11 results in the formation of a corresponding protrusion 29b, and so forth.

Generally, each depression/notch 27(a-l) has a width 32 that can range from about 0.05 millimeters to about 0.25 millimeters, in some embodiments from about 0.075 millimeters to about 0.225 millimeters, in some embodiments from about 0.10 millimeters to about 0.15 millimeters, and in some embodiments from about 0.115 millimeters to about 0.135 millimeters. Further, each depression/notch 27(a-l) has a depth 37, as measured from the apex (e.g., 39a, 39b, etc.) of each wall to the base of each wall (e.g., 41a, 41b, etc.) that can range from about 0.05 millimeters to about 0.25 millimeters, in some embodiments from about 0.075 millimeters to about 0.225 millimeters, in some embodiments from about 0.10 millimeters to about 0.15 millimeters, and in some embodiments from about 0.115 millimeters to about 0.135 millimeters. Meanwhile, as shown in FIGS. 1 and 2 each protrusion 29(a-j) can have a width 33, which can also be defined as the distance between one notch 27(a-l) and a second notch 27(a-l), that can range from about 0.125 millimeters to about 0.325 millimeters, in some embodiments from about 0.15 millimeters to about 0.30 millimeters, in some embodiments from about 0.175 millimeters to about 0.275 millimeters, and in some embodiments from about 0.20 millimeters to about 0.25 millimeters.

As shown in FIGS. 1-2 and 5, each depression/notch is defined by opposing convex-shaped walls. For example, notch 27a is defined by first opposing wall 30a and second opposing wall 31a, while notch 27b is defined by first opposing wall 30*b* and second opposing wall 31*b*. As shown in FIGS. 1-2, first opposing wall 30*b* of notch 27*b* has an apex 39*a* and a base 41*a* and second opposing wall 31*b* of notch 27*b* has an apex 39*b* and a base 41*b*. Further, the second wall 31*a* of first notch 27*a* can extend to the first wall 30*b* of second notch 27*b* at apex 39*a* so that the resulting protrusion 29*a* has a generally semi-circular shape. In addition, the second wall 31*b* of second notch 27*b* can extend to the first wall 30*c* of third notch 27*c* at apex 39*b* so that the resulting protrusion 29*b* has a generally semi-circular shape.

FIGS. 1 and 2 also show that a first tangent line 34 can be drawn at a tangent point A on first wall 30*b* and a second tangent line 35 can be drawn at a tangent point B on second opposing wall 31*b* of notch 27*b* such that the first tangent line 34 and the second tangent line 35 intersect at a point 38. Tangent point A is located at the midpoint between the apex 39*a* and base 41*a* for the first wall 30*b*, while tangent point B is located at the midpoint between the apex 39*b* and base 41*b* of the second wall 31*b*. The resulting angle 36 formed between the first tangent line 34 and the second tangent line 35 can range from about 20° to about 40°, in some embodiments from about 25° to about 35°, in some embodiments from about 28° to about 32°, and in some embodiments from about 29° to about 31°. For example, in one particular embodiment, the resulting angle can be 30°.

Figure 6:
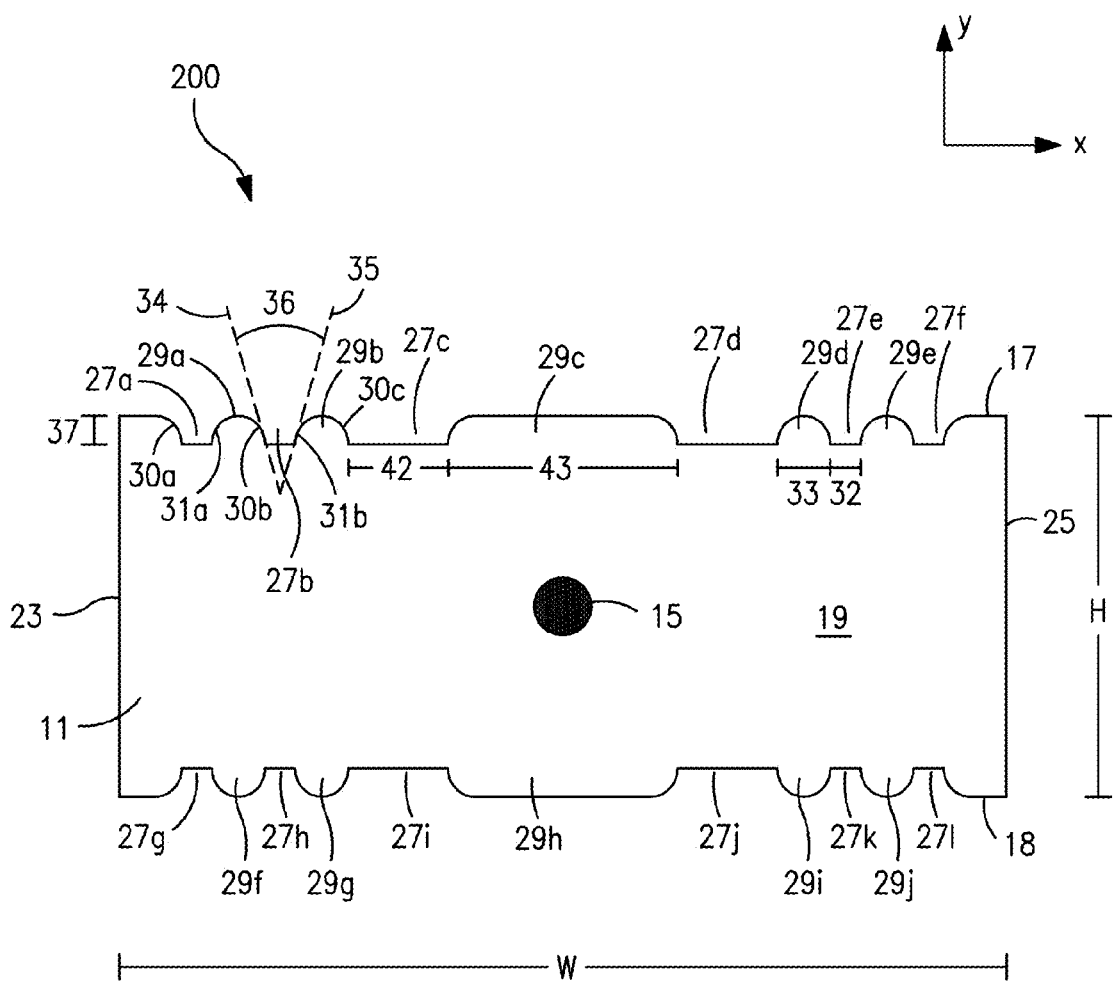
FIG. 6 is a cross-sectional view of the front surface of one embodiment of an anode of the present invention.
Figure 7:
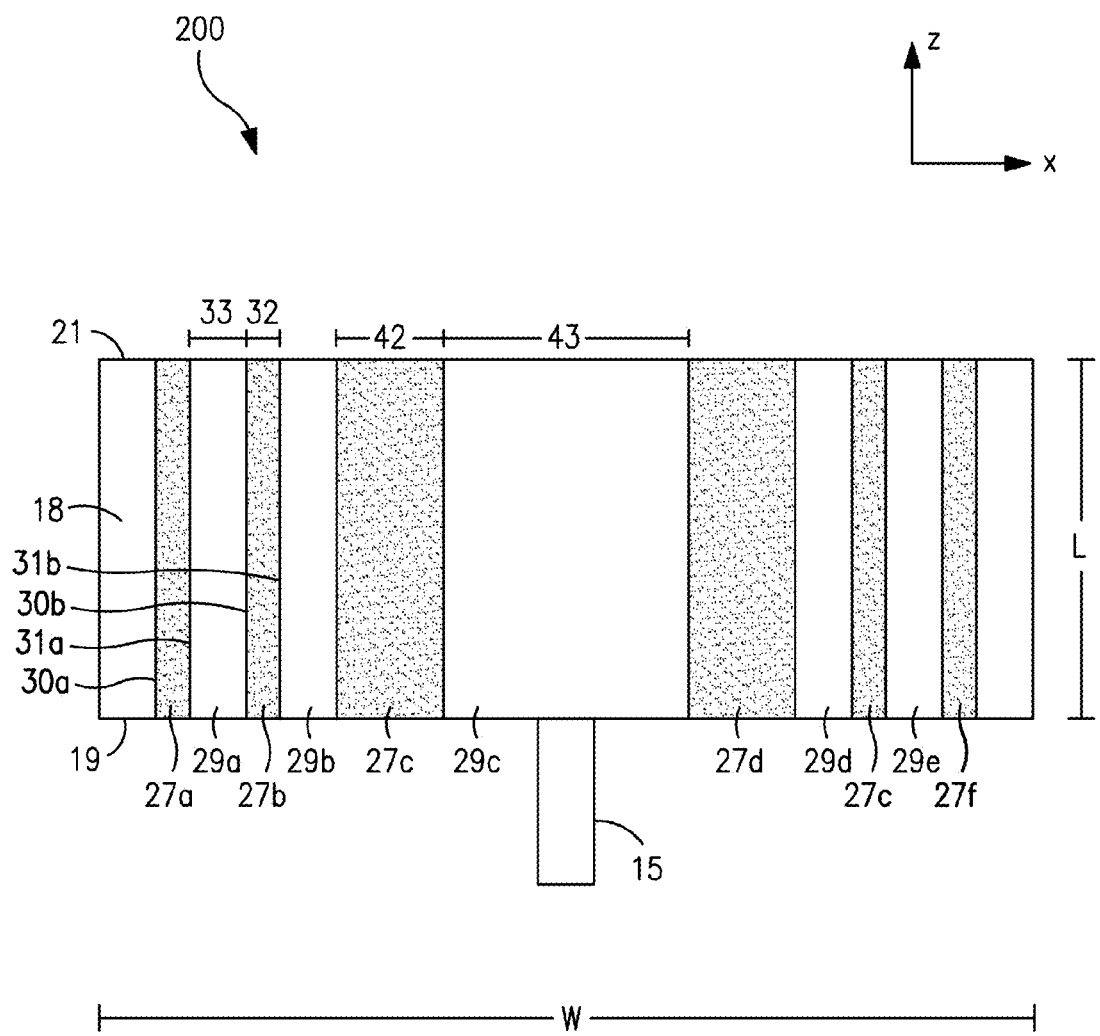
FIG. 7 is a top view of the anode of FIG. 6.
Figure 8:
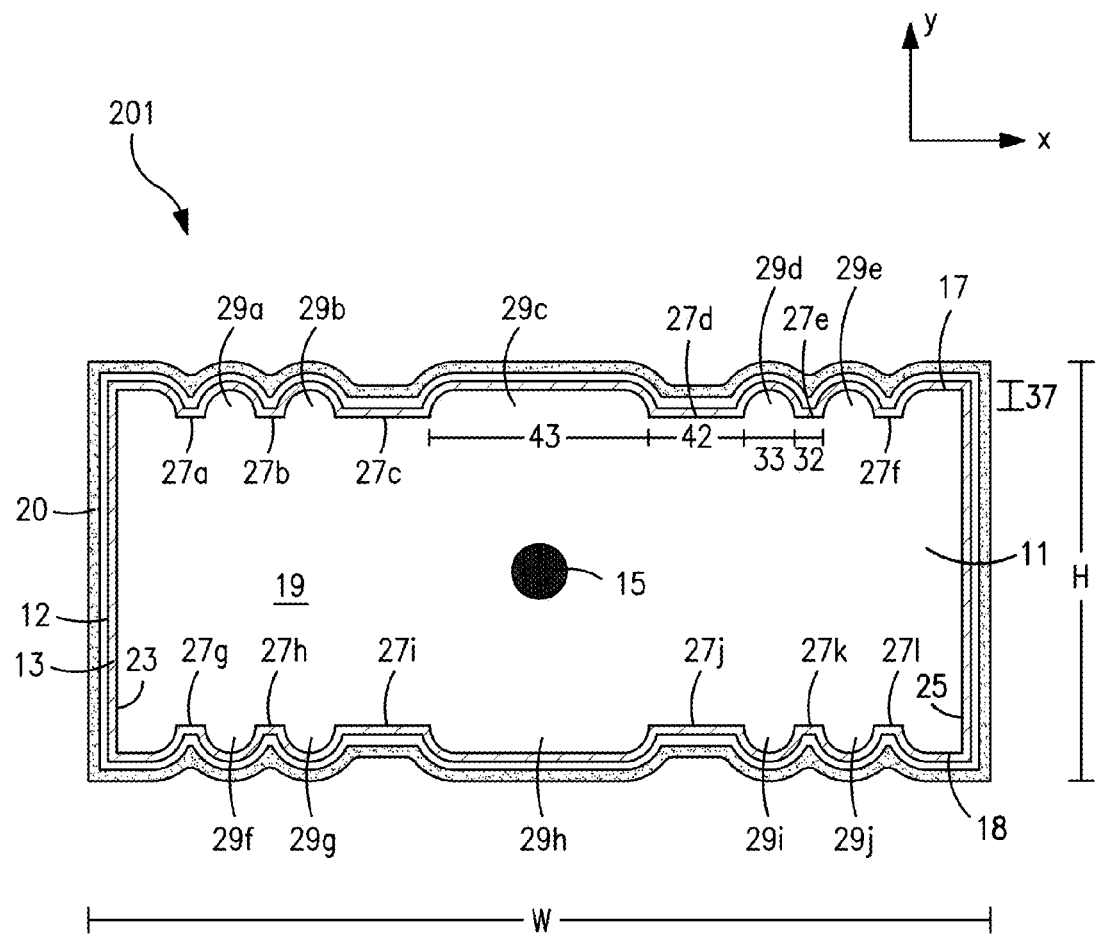
FIG. 8 is a cross-sectional view of a front surface of one embodiment of a solid electrolytic capacitor element of the present invention.
Figure 9A:
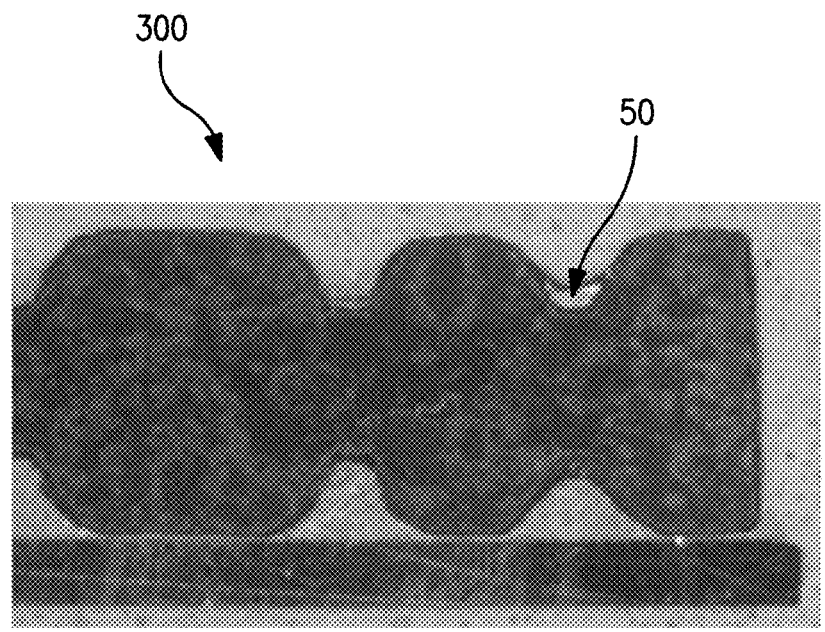
FIGS. 9(a), 9(b), 9(c), and 9(d) show a cross-sectional view of a front surface of a solid electrolytic capacitor element, where ineffective drainage of coating solutions results in bridge formation.
Figure 9B:
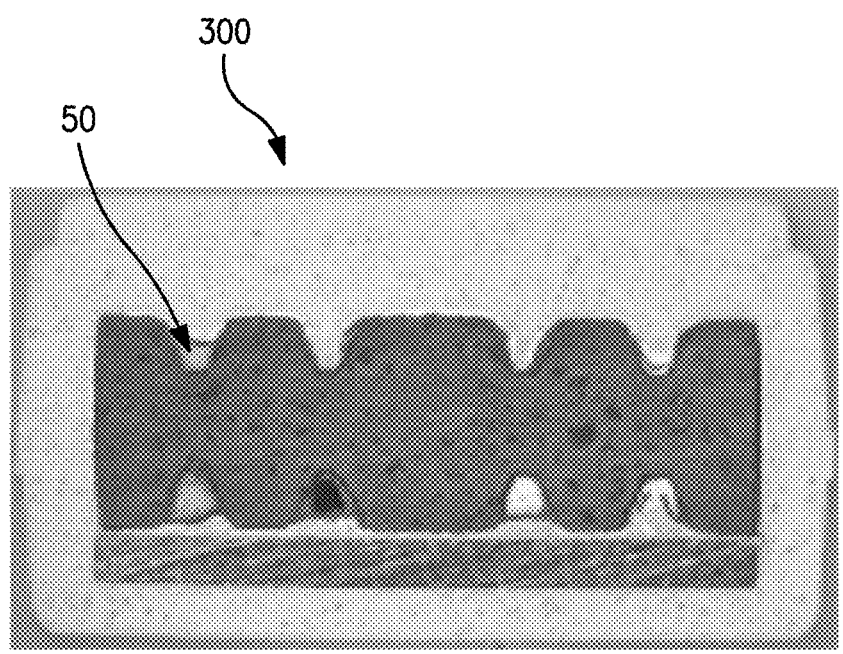
Figure 9C:
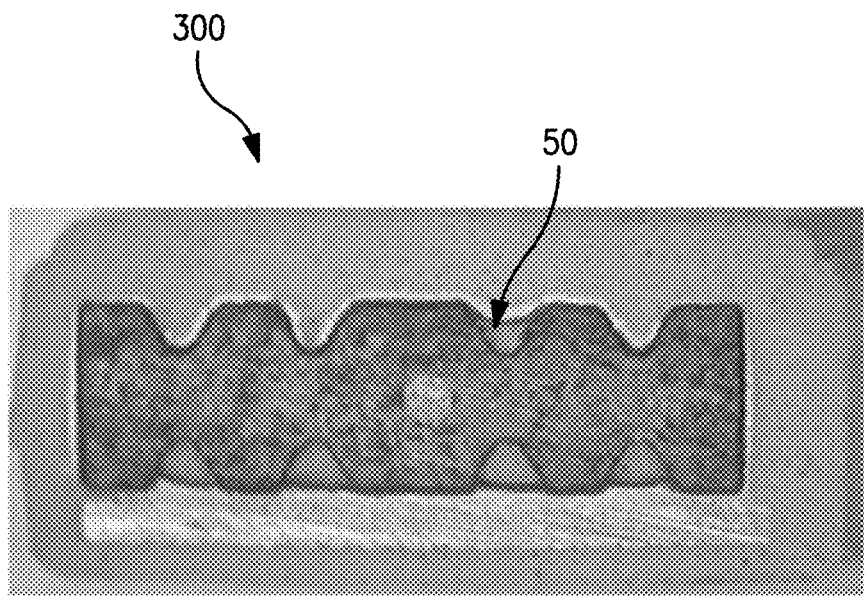
Figure 9D:
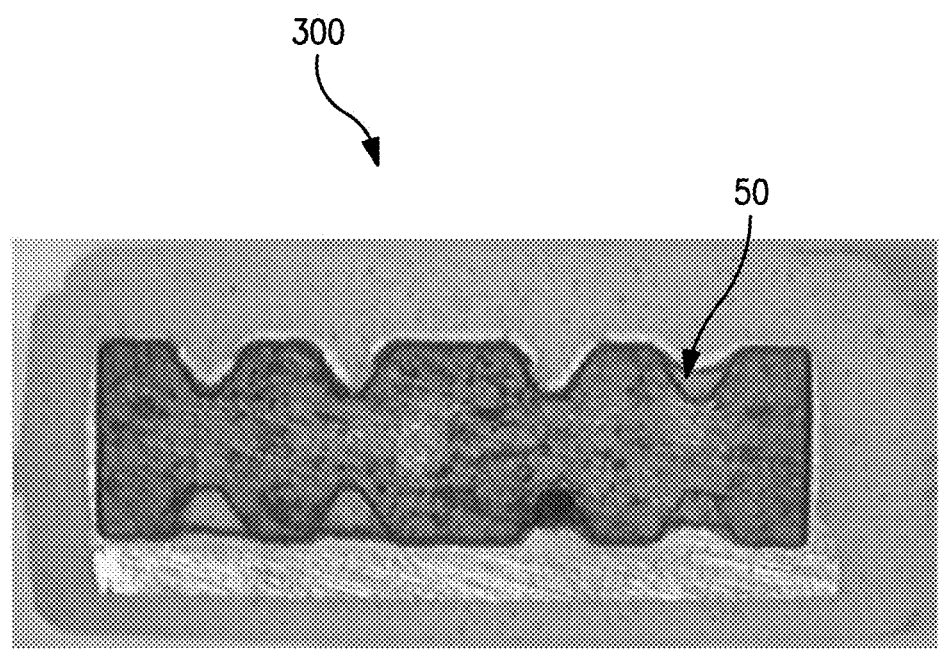

Although FIGS. 1, 3, and 5 show an anode or capacitor element where the depressions/notches 27(*a-l*) generally have the same width 32 and the protrusions 29(*a-j*) generally have the same width 33, this is not required, and it is possible that one or more of the depressions/notches may have a different width than the other depressions/notches and that one or more of the protrusions may have a different width than the other protrusions. For instance, as shown in FIGS. 6-8, an anode 200 and a capacitor element 201 are shown where the middle, or centrally located, protrusions 29*c* and 29*h* have a width that is larger than the width of the other protrusions 29(*a-b*), 29(*d-g*) and 29(*i-j*). Further, the notches/depressions 27(*c-d*) and 27(*i-j*) located on either side of the middle protrusions 29*c* and 29*h* also have a width that is larger than the width of the other notches/depressions 27(*a-b*), 27(*e-h*), and 27(*k-l*).

Generally, as shown in FIGS. 6-8, the depressions/notches 27(*a-b*), 27(*e-h*), and 27(*k-l*) each have a width 32 that can range from about 0.05 millimeters to about 0.25 millimeters, in some embodiments from about 0.075 millimeters to about 0.225 millimeters, in some embodiments from about 0.10 millimeters to about 0.15 millimeters, and in some embodiments from about 0.115 millimeters to about 0.135 millimeters. Meanwhile, the larger depressions/notches 27(*c-d*) and 27(*i-j*) each have a width 42 that can range from about 1.1 times to about 5 times the width of the smaller depressions/notches 27(*a-b*), 27(*e-h*), and 27(*k-l*), in some embodiments from about 1.25 times to about 4 times the width of the smaller depressions/notches 27(*a-b*), 27(*e-h*), and 27(*k-l*), in some embodiments from about 1.5 times to about 3.5 times the width of the smaller depressions/notches 27(*a-b*), 27(*e-h*), and 27(*k-l*), and in some embodiments from about 2 times to about 3 times the width of the smaller depressions/notches 27(*a-b*), 27(*e-h*), and 27(*k-l*). This corresponds with larger depressions/notches 27(*c-d*) and 27(*i-j*) having a width 42 that can range from about 0.055 millimeters to about 1.25 millimeters, in some embodiments from about 0.09375 millimeters to about 0.9 millimeters, in some embodiments from about 0.15 millimeters to about 0.525 millimeters, and in some embodiments from about 0.23 millimeters to about 0.405 millimeters. Regardless of the width of the various depressions/notches, each depression/notch 27(*a-l*) has a depth 37, as measured from the apex (e.g., 39*a*, 39*b*, etc.) of each wall to the base of each wall (e.g., 41*a*, 41*b*, etc.) that can range from about 0.05 millimeters to about 0.25 millimeters, in some embodiments from about 0.075 millimeters to about 0.225 millimeters, in some embodiments from about 0.10 millimeters to about 0.15 millimeters, and in some embodiments from about 0.115 millimeters to about 0.135 millimeters.

Further, as shown in FIGS. 6-8, the protrusions 29(*a-b*), 29(*d-g*) and 29(*i-j*) can each have a width 33 that can range from about 0.125 millimeters to about 0.325 millimeters, in some embodiments from about 0.15 millimeters to about 0.30 millimeters, in some embodiments from about 0.175 millimeters to about 0.275 millimeters, and in some embodiments from about 0.20 millimeters to about 0.25 millimeters. Meanwhile, the larger protrusions 29*c* and 29*h* each have a width 43 that can range from about 1.1 times to about 10 times the width of the smaller protrusions 29(*a-b*), 29(*d-g*), and 29(*i-j*), in some embodiments from about 15 times to about 7.5 times the width of the smaller protrusions 29(*a-b*), 29(*d-g*), and 29(*i-j*), in some embodiments from about 2 times to about 6 times the width of the smaller protrusions 29(*a-b*), 29(*d-g*), and 29(*i-j*), and in some embodiments from about 3 times to about 5 times the width of the smaller protrusions 29(*a-b*), 29(*d-g*), and 29(*i-j*). This corresponds with larger protrusions 29*c* and 29*h* having a width 43 that can range from about 0.1375 millimeters to about 3.25 millimeters, in some embodiments from about 0.225 millimeters to about 2.25 millimeters, in some embodiments from about 0.35 millimeters to about 1.65 millimeters, and in some embodiments from about 0.6 millimeters to about 1.25 millimeters.

Without intending to be limited by theory, the present inventors have discovered that the combination of the width and depth of the notches in the anode of the present invention, along with the angle formed between the tangent lines of the curved walls of the notches, results in an anode configuration that prevents delamination of additional layers that may be applied to the anode, such as the solid electrolyte and externals layers, which can include conductive polymer layers, carbonaceous layers, and metal layers as discussed in more detail below. This, in turn, results in a capacitor having enhanced electrical capabilities, such as reduced ESR. As a result of the anode design of the present disclosure, a capacitor may be formed that exhibits excellent electrical properties as determined by the test procedures described below. For example, the capacitor of the present invention can exhibit an ultralow ESR, such as about 200 milliohms (mΩ) or less, in some embodiments about 100 mΩ or less, in some embodiments from about 0.01 mΩ to about 50 mΩ, in some embodiments from about 1 mΩ to about 25 mΩ, and in some embodiments from about 2 mΩ to about 20 mΩ, determined at a frequency of 100 kHz and a temperature of 23° C.±2° C. Further the capacitor of the present invention can exhibit a leakage current at a temperature of 25° C. of less than about 0.02 μA after 10 seconds, such as from about 0.001 μA to about 0.015 μA, such as from about 0.005 μA to about 0.01 μA.

Figure 4:
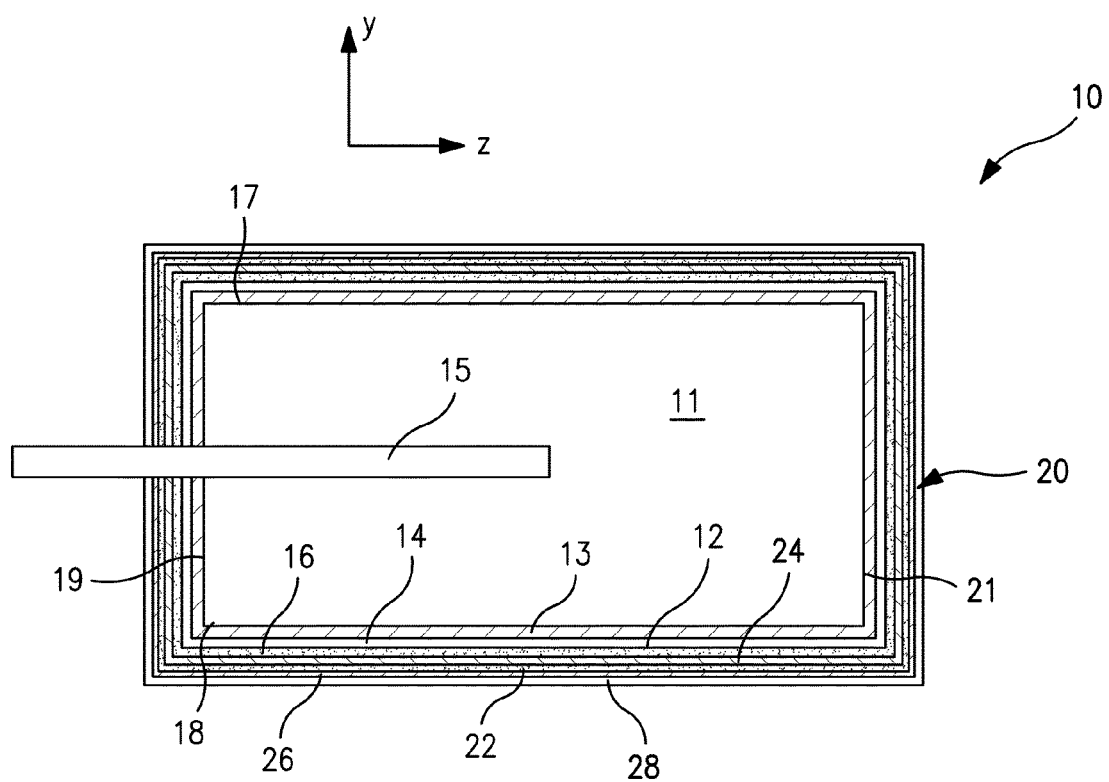
FIG. 4 is a cross-sectional view of a side surface of one embodiment of a solid electrolytic capacitor element of the present invention.

Typically, the anode of the present invention also contains an anode lead wire that helps connect the anode to the terminations of the resulting capacitor. The lead wire may be formed from any electrically conductive material, such as tantalum, niobium, nickel, aluminum, hafnium, titanium, etc., as well as oxides and/or nitrides of thereof. Although not necessarily required, it is often desired that the lead wire extend in the same longitudinal direction as the channels. In the embodiment of FIGS. 3-4, for example, an anode lead wire 15 extends in the longitudinal "z" direction from the front surface 19 of the anode body 11. Electrical contact with the anode 100 may be accomplished in a variety of ways, such as by coupling the lead wire 15 using resistance or laser welding. Alternatively, the lead wire 15 may be embedded into the anode body during its formation (e.g., prior to sintering) as discussed above.

II. Dielectric

A dielectric also overlies or coats the anode body. The dielectric may be formed by anodically oxidizing ("anodizing") the sintered anode so that a dielectric layer is formed over and/or within the anode body. For example, a tantalum (Ta) anode may be anodized to tantalum pentoxide ($Ta_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Although not required, in certain embodiments, the dielectric layer may possess a differential thickness throughout the anode body in that it possesses a first portion that overlies an external surface of the anode body and a second portion that overlies an interior surface of the anode body. In such embodiments, the first portion is selectively formed so that its thickness is greater than that of the second portion. It should be understood, however, that the thickness of the dielectric layer need not be uniform within a particular region. Certain portions of the dielectric layer adjacent to the external surface may, for example, actually be thinner than certain portions of the layer at the interior surface, and vice versa. Nevertheless, the dielectric layer may be formed such that at least a portion of the layer at the external surface has a greater thickness than at least a portion at the interior surface. Although the exact difference in these thicknesses may vary depending on the particular application, the ratio of the thickness of the first portion to the thickness of the second portion is typically from about 1.2 to about 40, in some embodiments from about 1.5 to about 25, and in some embodiments, from about 2 to about 20.

To form a dielectric layer having a differential thickness, a multi-stage process is generally employed. In each stage of the process, the sintered anode body is anodically oxidized ("anodized") to form a dielectric layer (e.g., tantalum pentoxide). During the first stage of anodization, a relatively small forming voltage is typically employed to ensure that the desired dielectric thickness is achieved for the inner region, such as forming voltages ranging from about 1 to about 90 volts, in some embodiments from about 2 to about 50 volts, and in some embodiments, from about 5 to about 20 volts. Thereafter, the sintered body may then be anodically oxidized in a second stage of the process to increase the thickness of the dielectric to the desired level. This is generally accomplished by anodizing in an electrolyte at a higher voltage than employed during the first stage, such as at forming voltages ranging from about 50 to about 350 volts, in some embodiments from about 60 to about 300 volts, and in some embodiments, from about 70 to about 200 volts. During the first and/or second stages, the electrolyte may be kept at a temperature within the range of from about 15° C. to about 95° C., in some embodiments from about 20° C. to about 90° C., and in some embodiments, from about 25° C. to about 85° C.

The electrolytes employed during the first and second stages of the anodization process may be the same or different. Typically, however, it is desired to employ different solutions to help better facilitate the attainment of a higher thickness at the outer portions of the dielectric layer. For example, it may be desired that the electrolyte employed in the second stage has a lower ionic conductivity than the electrolyte employed in the first stage to prevent a significant amount of oxide film from forming on the internal surface of anode body. In this regard, the electrolyte employed during the first stage may contain an acidic compound, such as hydrochloric acid, nitric add, sulfuric acid, phosphoric acid, polyphosphoric acid, boric acid, boronic acid, etc. Such an electrolyte may have an electrical conductivity of from about 0.1 to about 100 mS/cm, in some embodiments from about 0.2 to about 20 mS/cm, and in some embodiments, from about 1 to about 10 mS/cm, determined at a temperature of 25° C. The electrolyte employed during the second stage typically contains a salt of a weak acid so that the hydronium ion concentration increases in the pores as a result of charge passage therein. Ion transport or diffusion is such that the weak acid anion moves into the pores as necessary to balance the electrical charges. As a result, the concentration of the principal conducting species (hydronium ion) is reduced in the establishment of equilibrium between the hydronium ion, acid anion, and undissociated acid, thus forms a poorer-conducting species. The reduction in the concentration of the conducting species results in a relatively high voltage drop in the electrolyte, which hinders further anodization in the interior while a thicker oxide layer is being built up on the outside to a higher formation voltage in the region of continued high conductivity. Suitable weak acid salts may include, for instance, ammonium or alkali metal salts (e.g., sodium, potassium, etc.) of boric acid, boronic acid, acetic acid, oxalic acid, lactic acid, adipic acid, etc. Particularly suitable salts include sodium tetraborate and ammonium pentaborate. Such electrolytes typically have an electrical conductivity of from about 0.1 to about 20 mS/cm, in some embodiments from about 0.5 to about 10 mS/cm, and in some embodiments, from about 1 to about 5 mS/cm, determined at a temperature of 25° C.

If desired, each stage of anodization may be repeated for one or more cycles to achieve the desired dielectric thickness. Furthermore, the anode body may also be rinsed or washed with another solvent (e.g., water) after the first and/or second stages to remove the electrolyte.

III. Solid Electrolyte

A solid electrolyte overlies the dielectric that generally functions as the cathode for the capacitor. The solid electrolyte contains a conductive polymer, which is typically π-conjugated and have electrical conductivity after oxidation or reduction, such as an electrical conductivity of at least about 1 μS/cm. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Suitable polythiophenes may include, for instance, polythiophene and derivatives thereof, such as poly(3,4-ethylenedioxythiophene) ("PEDT"). In one particular embodiment, a polythiophene derivative is employed with recurring units of general formula (I) or formula (II) or recurring units of general formulae (I) and (II):

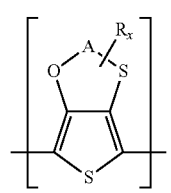

(I)

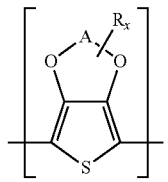

(II)

wherein,

A is an optionally substituted $C_1$ to $C_5$ alkylene radical (e.g., methylene, ethylene, n-propylene, n-butylene, n-pentylene, etc.);

R is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and x is an integer from 0 to 8, in some embodiments, from 0 to 2, and in some embodiments, x is 0. Example of substituents for the radicals "A" or "R" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

The total number of recurring units of general formula (I) or formula (II) or of general formulae (I) and (II) is typically from 2 to 2,000, and in some embodiments, from 2 to 100.

Particularly suitable polythiophene derivatives are those in which "A" is an optionally substituted $C_2$ to $C_3$ alkylene radical and x is 0 or 1. In one particular embodiment, the polythiophene derivative is PEDT and has recurring units of formula (II), wherein "A" is $CH_2$—$CH_2$ and "x" is 0. Methods for forming such polythiophene derivatives are well known in the art and described, for instance, in U.S. Pat. No. 6,987,663 to Merker, et al., which is incorporated herein in its entirety by reference thereto for all purposes. For example, the polythiophene derivatives may be formed from a monomeric precursor, such as optionally substituted thiophenes. Particularly suitable monomeric precursors are substituted 3,4-alkylenedioxythiophenes having the general formula (III), (IV) or a mixture of thiophene of general formulae (III) and (IV):

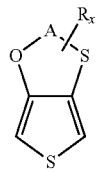

(III)

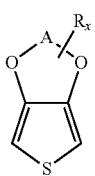
(IV)

wherein, A, R, and X are as defined above.

Examples of such monomeric precursors include, for instance, optionally substituted 3,4-ethylenedioxythiophenes. Derivatives of these monomeric precursors may also be employed that are, for example, dimers or trimers of the above monomeric precursors. Higher molecular derivatives, i.e., tetramers, pentamers, etc. of the monomeric precursors are suitable for use in the present invention. The derivatives may be made up of identical or different monomer units and used in pure form and in a mixture with one another and/or with the monomeric precursors. Oxidized or reduced forms of these precursors may also be employed.

To produce the desired conductive polymer, monomeric precursors, such as described above, typically undergo oxidative polymerization in the presence of an oxidizing agent. The oxidizing agent may be a transition metal salt, such as a salt of an inorganic or organic acid that contain iron(III), copper(II), chromium(VI), cerium(IV), manganese(IV), manganese(VII), or ruthenium(III) cations. Particularly suitable transition metal salts include iron(III) cations, such as iron(III) halides (e.g., $FeCl_3$) or iron(III) salts of other inorganic acids, such as $Fe(ClO4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable for use in the present invention.

Various methods may be utilized to apply the solid electrolyte onto the anode part. In one embodiment, the oxidizing agent and monomeric precursor are applied, either sequentially or together, such that the polymerization reaction occurs in situ on the part. Suitable application techniques may include screen-printing, dipping, electrophoretic coating, and spraying, may be used to form a conductive polymer coating. As an example, the monomeric precursor (e.g., 3,4-ethylenedioxy-thiophene) may initially be mixed with the oxidizing agent to form a solution. One suitable oxidizing agent is CLEVIOS™ C, which is iron III toluenesulfonate and sold by H.C. Starck. CLEVIOS™ C is a commercially available catalyst for CLEVIOS™ M, which is 3,4-ethylene dioxythiophene, a PEDT monomer also sold by H.C. Starck. Once the mixture is formed, the anode part may then be dipped into the solution so that the polymer forms on the surface of the anode part. Alternatively, the oxidizing agent and precursor may also be applied separately to the anode part. In one embodiment, for example, the oxidizing agent is dissolved in an organic solvent (e.g., butanol) and then applied to the anode part as a dipping solution. The anode part may then be dried to remove the solvent therefrom. Thereafter, the anode part may be dipped into a solution containing the appropriate monomer.

As the monomer contacts the surface of the anode part containing the oxidizing agent, it may chemically polymerize thereon. Polymerization may be performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Publication No. 2008/232037 to Biler. Still other methods for applying such conductive polymer coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to in situ application, the solid electrolyte may also be applied to the part in the form of a dispersion of solid conductive polymer particles. Although their size may vary, it is typically desired that the particles possess a small diameter to increase the surface area available for adhering to the anode part. To enable good impregnation of the anode body, the particles employed in the dispersion typically have a small size, such as an average size (e.g., diameter) of from about 1 to about 150 nanometers, in some embodiments from about 2 to about 50 nanometers, and in some embodiments, from about 5 to about 40 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments, from about 0.5 to about 4 wt. % of the dispersion.

The formation of the conductive polymers into a particulate form may be enhanced by using a separate counterion to counteract a charged conductive polymer (e.g., polythiophene). That is, the conductive polymer (e.g., polythiophene or derivative thereof) used in the solid electrolyte typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in a given layer of the solid electrolyte is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization.

In addition to conductive polymer(s) and optional counterion(s), the dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the formation of the solid electrolyte and the ability to apply it to the anode part. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyltrimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), and alcohols (e.g., ethylene glycol, glycerol, di- or triethylene glycol).

The polymeric dispersion may be applied to the part using a variety of known techniques, such as by spin coating, impregnation, pouring, dropwise application, injection, spraying, doctor blading, brushing or printing (e.g., ink-jet, screen, or pad printing). Although it may vary depending on the application technique employed, the viscosity of the dispersion is typically from about 0.1 to about 100,000 mPa·s (measured at a shear rate of 100 $s^{-1}$), in some embodiments from about 1 to about 10,000 mPa·s, in some embodiments from about 10 to about 1,500 mPa·s, and in some embodiments, from about 100 to about 1000 mPa·s. Once applied, the layer may be dried and washed. One or more additional layers may also be formed in this manner to achieve the desired thickness. Typically, the total thickness of the layer(s) formed by this particle dispersion is from about 1 to about 50 μm, and in some embodiments, from about 5 to about 20 μm. The weight ratio of counterions to conductive polymers is likewise from about 0.5:1 to about 50:1, in some embodiments from about 1:1 to about 30:1, and in some embodiments, from about 2:1 to about 20:1.

In addition to applying the solid electrolyte via in situ polymerization or via the application of a dispersion of conductive polymer particles, it is also to be understood that the solid electrolyte can be applied via a hybrid process that combines both in situ polymerization and the application of a dispersion of conductive polymer particles. Referring to FIG. 4, for example, one embodiment of a capacitor element 10 is shown that contains a solid electrolyte 12 formed from multiple layers. More specifically, the solid electrolyte 12 includes a first conductive polymer layer 14 that is in contact with a dielectric 13 that overlies an anode body 11 embedded with a lead 15. In one embodiment, the first layer 14 may contain a conductive polymer (e.g., PEDT) that is formed through in situ polymerization of an oxidizing agent and monomeric precursor. The solid electrolyte 12 also contains a second conductive polymer layer 16 that generally overlies the first layer 14. The second layer 16 may be formed from a dispersion of particles that contains a conductive polymer (e.g., PEDT), binder, and an optional counterion (e.g., PSS). One benefit of employing such a dispersion is that it may be able to penetrate into the edge region of the capacitor body to achieve good electrical contact with the inner layer and increase the adhesion to the capacitor body. This results in a more mechanically robust part, which may reduce equivalent series resistance and leakage current. On the other hand, in another embodiment, the solid electrolyte 12 may be a single conductive polymer layer as shown in FIG. 5. Regardless of how many layers it includes, the resulting solid electrolyte 12 typically has a total thickness of from about 1 micrometer ($\mu$m) to about 200 $\mu$m, in some embodiments from about 2 $\mu$m to about 50 $\mu$m, and in some embodiments, from about 5 $\mu$m to about 30 $\mu$m. Further, if the solid electrolyte includes two layers such as an inner layer and an outer layer, the inner layer 14 may have a total thickness of from about 0.1 $\mu$m to about 100 $\mu$m, in some embodiments from about 0.5 $\mu$m to about 20 $\mu$m, and in some embodiments, from about 1 $\mu$m to about 5 $\mu$m, while the outer layer 16 may have a total thickness of from about 0.2 $\mu$m to about 100 $\mu$m, in some embodiments from about 1 $\mu$m to about 40 $\mu$m, and in some embodiments, from about 3 $\mu$m to about 10 $\mu$m.

Regardless of the particular manner in which it is formed, the solid electrolyte may be healed upon application to the anode part. Healing may occur after each application of a solid electrolyte layer or may occur after the application of the entire coating if multiple layers are employed. In some embodiments, for example, the solid electrolyte may be healed by dipping the pellet into an electrolyte solution, such as a solution of acid, and thereafter applying a constant voltage to the solution until the current is reduced to a preselected level. If desired, such healing may be accomplished in multiple steps. After application of some or all of the layers described above, the resulting part may then be washed if desired to remove various byproducts, excess oxidizing agents, and so forth. Further, in some instances, drying may be utilized after some or all of the dipping operations described above. For example, drying may be desired after applying the oxidizing agent and/or after washing the pellet in order to open the pores of the part so that it can receive a liquid during subsequent dipping steps.

IV. External Coating

The capacitor of the present invention also contains an external coating that overlies the solid electrolyte. The external coating contains at least one carbonaceous layer and at least one metal layer that overlies the carbonaceous layer. The metal layer may act as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. The carbonaceous layer may limit contact between the metal layer and the solid electrolyte, which would otherwise increase the resistance of the capacitor. The carbonaceous layer may be formed from a variety of known carbonaceous materials, such as graphite, activated carbon, carbon black, etc. The thickness of the carbonaceous layer is typically within the range of from about 1 $\mu$m to about 50 $\mu$m, in some embodiments from about 2 $\mu$m to about 30 $\mu$m, and in some embodiments, from about 5 $\mu$m to about 10 $\mu$m. Likewise, the thickness of the metal layer is typically within the range of from about 1 $\mu$m to about 100 $\mu$m, in some embodiments from about 5 $\mu$m to about 50 $\mu$m, and in some embodiments, from about 10 $\mu$m to about 25 $\mu$m.

In addition to the layers noted above, the external coating may also contain at least one polymer layer that is positioned between the carbonaceous layer and the metal layer. For instance, the external coating may contain a polymer layer when the solid electrolyte discussed above is applied via in situ polymerization. Among other things, this layer may help inhibit delamination of the carbonaceous layer from the anode part in conjunction with the shape of the anode itself. The thickness of the layer typically ranges from about 0.1 $\mu$m to about 30 $\mu$m, in some embodiments from about 0.2 $\mu$m to about 20 $\mu$m, in some embodiments from about 0.5 $\mu$m to about 5 $\mu$m, and in some embodiments, from about 1 $\mu$m to about 3 $\mu$m. To optimize the electrical performance of the capacitor, the polymer layer is generally conductive in nature. For example, the layer typically has a specific conductivity, in the dry state, of about 1 Siemen per centimeter ("S/cm") or more, in some embodiments about 10 S/cm or more, in some embodiments about 20 S/cm or more, and in some embodiments, from about 50 to about 500 S/cm. Such conductivity is imparted through the use of a conductive polymer, such as the $\pi$-conjugated conductive polymers described above, e.g., polyheterocycles (e.g., polypyrroles, polythiophenes, polyanilines, etc.), polyacetylenes, poly-p-phenylenes, polyphenolates, and so forth. Particularly suitable polythiophenes include, for instance, polythiophene and derivatives thereof, such as poly(3,4-ethylenedioxythiophene) ("PEDT").

The conductive polymer layer may be formed through in situ polymerization, dispersions, etc., in the manner described above. In one embodiment, for example, the layer contains a conductive polymer (e.g., PEDT) formed through in situ polymerization of an oxidizing agent and monomeric precursor. In another embodiment, the conductive polymer layer is formed from a dispersion of conductive polymer particles. The particles may have an average diameter of from about 1 to about 500 nanometers (nm), in some embodiments from about 5 to about 400 nanometers, and in some embodiments, from about 10 to about 300 nanometers. The $D_{90}$ value of the particles may be about 15 $\mu$m or less, in some embodiments about 10 micrometers or less, and in some embodiments, from about 1 nm to about 8 $\mu$m. A counterion (e.g., polystyrene sulfonic acid) may also be employed as described above to assist in the formation of the particles. The weight ratio of such counterions to conductive polymers may be from about 0.5:1 to about 50:1, in some embodiments from about 1:1 to about 30:1, and in some embodiments, from about 2:1 to about 20:1. In addition to conductive polymer(s) and optional counterion(s), the dispersion may also contain other components as described above. For instance, binders may be employed to enhance the adhesive nature of the layer and increase stability. Typically, however, the conductive polymers constitute from about 0.1 wt. % to about 20 wt. %, in some embodiments from about 0.5 wt. % to about 10 wt. %, and in some embodiments, from about 1 wt. % to about 5 wt.

% of the dispersion. Other ingredients may also be employed as described above, such as dispersion agents (e.g., water), fillers, surface-active substances, adhesives, additives that increase conductivity, and so forth.

Still other layers may also be employed in the external coating. For example, if desired, an additional carbonaceous layer may be employed between the conductive polymer layer (if any) and the metal layer, in this manner, the conductive polymer layer is sandwiched between carbonaceous layers. Such an additional carbonaceous layer may help further reduce the likelihood that any metal will inadvertently contact the solid electrolyte of the capacitor. When employed, such an additional layer may have a thickness of from about 1 µm to about 50 µm, in some embodiments from about 2 µm to about 20 µm, and in some embodiments, from about 5 µm to about 10 µm.

Referring again to FIG. 4, one particular embodiment of an external coating 20 is shown that contains a conductive polymer layer sandwiched between multiple carbonaceous layers. More specifically, the external coating 20 includes a conductive polymer layer 22 positioned between and in contact with a first carbonaceous layer 24 and a second carbonaceous layer 26. In one embodiment, the layer 22 is formed through in situ polymerization of an oxidizing agent and monomeric precursor. In another embodiment, the layer 22 is formed from a dispersion of particles that contains a conductive polymer (e.g., PEDT) and an optional counterion (e.g., PSS). The first carbonaceous layer 24 overlies and is contact with the solid electrolyte 12 of the capacitor element 10. Furthermore, the external coating 20 also include a metal layer 28 (e.g., silver) that overlies and is in contact with the second carbonaceous layer 26. In this particular embodiment, the metal layer 28 defines an external surface of the capacitor element 10. Typically, the resulting external coating 20 has a total thickness of from about 5 µm to about 300 µm, in some embodiments from about 10 µm to about 100 µm, and in some embodiments, from about 20 µm to about 50 µm. Note that FIG. 5 also shows the external coating 20 but for simplicity purposes does not break the external coating down into its separate layers. It should also be understood that it is not required that the external coating contain multiple carbonaceous layers or a conductive polymer layer, and in one embodiment, the external coating may include only a carbonaceous layer and a metal layer. For instance, the external coating may not include a conductive polymer layer when the solid electrolyte of the capacitor is applied in the form of a dispersion of particles or is applied as a combination of in situ polymerization and a dispersion as opposed to being applied via in situ polymerization alone. In such an embodiment, the external coating includes a carbonaceous layer applied over the solid electrolyte, followed by a metal layer such as a silver layer.

Regardless of the various coating layers present, the present inventors have found that the particular geometry of the notches formed in the anodes of the capacitor elements of the present invention allows for effective drainage of any conductive polymer coating solutions or any other coating solutions. For instance, the notch geometry of the present invention allows for effective draining of the conductive polymer, carbon/graphite, and/or metal (e.g., silver) coating solutions during production. Because effective drainage is permitted due to the geometry of the notches in the anodes of the present invention, bridge formation is prevented. On the other hand, bridges may form in anodes having notches formed without the particular geometry of the present invention. For instance, FIGS. 9(a), 9(b), 9(c), and 9(d) demonstrate how other notch geometries can lead to the formation of polymer bridges 50 in the anodes of a capacitor element 300.

V. Terminations

Further, the electrolytic capacitor of the present invention may also contain an anode termination to which the anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. The terminations may be connected using any technique known in the art, such as welding, adhesive bonding, etc. In one embodiment, for example, a conductive adhesive may initially be applied to a surface of the anode and/or cathode terminations. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al., which is incorporated herein in its entirety by reference thereto for all purposes.

Once the capacitor element is attached, the lead frame may be enclosed within a casing, which may then be filled with silica or any other known encapsulating material. The width and length of the case may vary depending on the intended application. Suitable casings may include, for instance, "A", "B", "F", "G" "H", "J", "K", "L" "M" "N" "P" "R", "S", "T", "W", "Y", or "X" cases (AVX Corporation). Regardless of the case size employed, the capacitor element is encapsulated so that at least a portion of the anode and cathode terminations are exposed. In some cases, the exposed portion of the anode and cathode terminations may be located at the bottom surface of the capacitor in a "facedown" configuration for mounting onto a circuit board. This increases the volumetric efficiency of the capacitor and likewise reduces its footprint on the circuit board. After encapsulation, exposed portions of the anode and cathode terminations may be aged, screened, and trimmed to the desired size.

The present invention may be better understood by reference to the following examples.

Test Procedures

Equivalent Series Resistance ("ESR") and Capacitance ("CAP")

Equivalence series resistance and impedance were measured using a Keithley 3330 Precision LCZ meter with Kelvin Leads with 0 volts bias and 1 volt signal. The operating frequency was 100 kHz. The capacitance and dissipation factor were measured using a Keithley 3330 Precision LCZ meter with Kelvin Leads with 2 volts bias and 1 volt signal. The operating frequency was 120 Hz and the temperature was 23° C.±2° C.

Leakage Current:

Leakage current ("DCL") was measured using a MC 190 Leakage test set made by Mantracourt Electronics LTD, UK.

The MC 190 test measures leakage current at a temperature of 25° C. and at a certain rated voltage after 10 seconds.

Example 1

40,000 µFV/g tantalum powder was used to form anode samples. Each anode sample was embedded with a tantalum wire, sintered at 1450° C., and pressed to a density of 5.3 g/cm$^3$. The resulting pellets had a size of 4.80 mm×3.30 mm×0.85 mm (standard "slab" design). The pellets were anodized to 70V in a water/phosphoric acid electrolyte with a conductivity of 8.6 mS/cm at a temperature of 85° C. to form the dielectric layer. The pellets were anodized again to 130V in a solution of water/boric acid/disodium tetraborate with a conductivity of 2.0 mS/cm at a temperature of 30° C. for 30 seconds to form a thicker oxide layer built up on the outside. A conductive polymer coating was then formed by dipping the anodes into a butanol solution of iron (Ill) toluenesulfonate (Clevios™ C, H.C. Starck) for 5 minutes and consequently into 3,4-ethylenedioxythiophene (Clevios™ M, H.C. Starck) for 1 minute. After 45 minutes of polymerization, a thin layer of poly(3,4-ethylenedioxythiophene) was formed on the surface of the dielectric. The parts were washed in methanol to remove reaction by-products, anodized in a liquid electrolyte, and washed again in methanol. This process was repeated 6 times. Thereafter, the parts were dipped into a dispersed poly(3,4-ethylenedioxythiophene) having a solids content of 2% and a viscosity of 20 mPa·s (Clevios™ K, H.C. Starck). Upon coating, the parts were dried at 125° C. for 20 minutes. This process was not repeated. Thereafter, the parts were dipped into a dispersed poly(3,4-ethylenedioxythiophene) having a solids content of 2% and a viscosity of 160 mPa·s (Clevios™ K, H.C. Starck). Upon coating, the parts were dried at 125° C. for 20 minutes. This process was repeated 8 times. The parts were then dipped into a graphite dispersion and dried. Finally, the parts were dipped into a silver dispersion and dried. Multiple parts (10,000) of 33 µF/25V capacitors were made in this manner.

Example 2

Capacitors were formed in the manner described in Example 1 (comparative), except that the anodes were formed in a mold so that the anodes contained depressions/notches in their lower surfaces. The resulting pellets had a size of 5.10 mm×3.60 mm×0.90 mm ("multinotched" design) with 10 notches/depressions on the lower surface of each pellet, where the notches had a depth of 0.125 mm and a width of 0.125 mm. Then, the electrical properties for Example 1 (comparative) and Example 2 were determined before and after three reflow cycles, as summarized below in Table 1.

TABLE 1

| | Electrical Properties | | | |
|---|---|---|---|---|
| | Reflow [count] | Cap [µF] | ESR [mΩ] | ΔESR [%] |
| Example 1 | — | 36.3 | 21.8 | — |
| | 1 | 36.5 | 30.1 | +38.1 |
| | 2 | 36.4 | 36.6 | +67.9 |
| | 3 | 36.3 | 40.8 | +87.2 |
| Example 2 | — | 37.6 | 15.4 | — |
| | 1 | 37.8 | 17.5 | +13.6 |
| | 2 | 37.5 | 19.6 | +27.3 |
| | 3 | 37.4 | 22.5 | +46.1 |

As indicated, the multinotched capacitor parts as described herein (Example 2) exhibited a lower ESR and improved reflow stability due to the improved adhesion of external coatings as a result of the "multinotched" anode design.

Example 3

35,000 µFV/g tantalum powder was used to form anode samples. Each anode sample was embedded with a tantalum wire, sintered at 1450° C., and pressed to a density of 5.3 g/cm$^3$. The resulting pellets had a size of 1.80 mm×2.40 mm×1.35 mm (standard "slab" design). The pellets were anodized to 60V in a water/phosphoric acid electrolyte with conductivity of 8.6 mS/cm at temperature of 85° C. to form the dielectric layer. The pellets were anodized again to 150V in a solution of water/boric acid/disodium tetraborate with a conductivity 2.0 mS/cm at a temperature of 30° C. for 30 seconds to form a thicker oxide layer built up on the outside. A conductive polymer coating was then formed by dipping the anodes into a dispersed poly(3,4-ethylenedioxythiophene) having a solids content of 1.1% and a viscosity of 20 mPa·s (Clevios™ K, H.C. Starck). Upon coating, the parts were dried at 125° C. for 20 minutes. This process was repeated 10 times. Thereafter, the parts were dipped into a dispersed poly(3,4-ethylenedioxythiophene) having a solids content of 2% and a viscosity of 20 mPa·s (Clevios™ K, H.C. Starck). Upon coating, the parts were dried at 125° C. for 20 minutes. This process was not repeated. Thereafter, the parts were dipped into a dispersed poly(3,4-ethylenedioxythiophene) having a solids content of 2% and a viscosity of 160 mPa·s (Clevios™ K, H.C. Starck). Upon coating, the parts were dried at 125° C. for 20 minutes. This process was repeated 8 times. The parts were then dipped into a graphite dispersion and dried. Finally, the parts were dipped into a silver dispersion and dried. Multiple parts (75,000) of 22 µF/25V capacitors were made in this manner.

Example 4

Capacitors were formed in the manner described in Example 3 (comparative), except that the anodes were formed in a mold so that the anodes contained depressions/notches in their lower surfaces. The resulting pellets had a size of 1.80 mm×2.35 mm×1.35 mm ("multinotched" design) with 6 notches/depressions on the lower surface of each pellet, where the notches/depressions had a depth of 0.125 mm and a width of 0.125 mm. Multiple parts (20,000) of 33 µF/25V capacitors were made in this manner. Then, the electrical properties for Example 3 (comparative) and Example 4 were determined, as summarized below in Table 2.

TABLE 2

| | Electrical Properties | | |
|---|---|---|---|
| | DCL [µA] | Cap [µF] | ESR [mΩ] |
| Example 3 | 0.02 | 19.2 | 124 |
| Example 4 | 0.01 | 18.0 | 83 |

As indicated moreover, the multinotched capacitor parts as described herein (Example 4) had a lower leakage current (DCL) and ESR than the standard slab parts (Example 3) due to improved adhesion of external coatings.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor that comprises a capacitor element, the capacitor element comprising:
a sintered, porous anode body having a plurality of notches located on one or more exterior surfaces of the anode body, wherein each notch is defined by a first wall and an opposing second wall, wherein the first wall and the second wall each have a convex shape, wherein the first wall and the second wall an apex and a base, further wherein an angle formed from an intersection of a first tangent line for the first wall and a second tangent line for the second wall ranges from about 20° to about 40°, wherein a tangent point for the first tangent line is drawn at a midpoint between the apex and the base of the first wall and a tangent point for the second tangent line is drawn at a midpoint between the apex and the base of the second wall, further wherein each notch has a depth of from about 0.050 millimeters to about 0.250 millimeters;
a dielectric overlying the anode body;
a solid electrolyte overlying the dielectric, wherein the solid electrolyte contains a first conductive polymer layer; and
an external coating that overlies the solid electrolyte and contains a carbonaceous layer and a metal layer that overlies the carbonaceous layer.

2. The solid electrolytic capacitor of claim 1, wherein one or more of the notches has a width of from about 0.050 millimeters to about 0.250 millimeters.

3. The solid electrolytic capacitor of claim 1, wherein two centrally located notches each have a width of from about 0.055 millimeters to about 1.25 millimeters.

4. The solid electrolytic capacitor of claim 1, wherein each notch has generally flat surface.

5. The solid electrolytic capacitor of claim 1, wherein the plurality of notches form corresponding protrusions, wherein the protrusions are located on one or more exterior surfaces of the anode body, further wherein one or more of the protrusions has a width of from about 0.125 millimeters to about 0.325 millimeters.

6. The solid electrolytic capacitor of claim 5, wherein each protrusion has a semi-circular shape.

7. The solid electrolytic capacitor of claim 5, wherein a centrally located protrusion has a width of from about 0.1375 millimeters to about 3.25 millimeters.

8. The solid electrolytic capacitor of claim 1, wherein the anode has a height of from about 0.25 millimeters to about 20 millimeters.

9. The solid electrolytic capacitor of claim 1, wherein the anode has a width of from about 0.50 millimeters to about 50 millimeters.

10. The solid electrolytic capacitor of claim 1, wherein the anode has a length of from about 0.25 millimeters to about 40 millimeters.

11. The solid electrolytic capacitor of claim 1, wherein the first conductive polymer layer contains a polypyrrole, polythiophene, polyaniline, polyacetylene, poly-p-phenylene, polyphenolate, or a combination thereof.

12. The solid electrolytic capacitor of claim 11, wherein the polythiophene is poly(3,4-ethylenedioxythiophene).

13. The solid electrolytic capacitor of claim 1, wherein the external coating further contains a second conductive polymer layer.

14. The solid electrolytic capacitor of claim 13, wherein the second conductive polymer layer is positioned between the carbonaceous layer and the metal layer.

15. The solid electrolytic capacitor of claim 13, wherein the second conductive polymer layer has a thickness of from about 0.2 µm to about 20 µm.

16. The solid electrolytic capacitor of claim 1, wherein the carbonaceous layer contains graphite.

17. The solid electrolytic capacitor of claim 1, wherein the metal layer contains silver.

18. The solid electrolytic capacitor of claim 1, wherein the external coating has a total thickness of from about 5 µm to about 300 µm.

19. The solid electrolytic capacitor of claim 1, wherein the anode body includes tantalum, niobium, or an electrically conductive oxide thereof.

20. The solid electrolytic capacitor of claim 1, further comprising an anode lead.

21. The solid electrolytic capacitor of claim 20, further comprising an anode termination that is electrically connected to the anode lead, a cathode termination that is electrically connected to the cathode, and a molding material that encapsulates the capacitor element and leaves exposed at least a part of the anode termination and at least a part of the cathode termination.

22. The solid electrolytic capacitor of claim 1, wherein 2 to 30 notches are present on each of the one or more exterior surfaces of the anode body.

* * * * *